United States Patent [19]
Huang et al.

[11] Patent Number: 5,539,746
[45] Date of Patent: Jul. 23, 1996

[54] CONTENTION RESOLUTION SCHEME FOR COMMUNICATIONS SYSTEMS

[75] Inventors: Gang Huang, Highlands; Mai-Huong Nguyen, Eatontown; Jean-Jacques Werner, Holmdel, all of N.J.

[73] Assignee: AT&T Corp., Murray Hill, N.J.

[21] Appl. No.: 422,750

[22] Filed: Apr. 14, 1995

Related U.S. Application Data

[63] Continuation of Ser. No. 938,197, Aug. 28, 1992, abandoned.

[51] Int. Cl.⁶ .................................. H04J 3/14; G06F 9/46
[52] U.S. Cl. ................. 370/85.2; 364/242.6; 364/242.8; 364/242.9; 364/242.92
[58] Field of Search ............................. 364/242.6, 242.8, 364/242.9, 242.92; 370/85.2, 85.1, 85.6, 60, 94.1, 85.9, 85.5, 85.7; 340/825.5, 825.51, 825.3, 825.34, 825.47

[56] References Cited

U.S. PATENT DOCUMENTS

| | | | |
|---|---|---|---|
| 3,764,981 | 10/1973 | Takasugi | 370/85.6 |
| 3,863,220 | 1/1975 | Osawa et al. | 370/85.6 |
| 5,265,215 | 11/1993 | Fukuda et al. | 370/85.2 |

FOREIGN PATENT DOCUMENTS 0214840  3/1987  European Pat. Off. ........ G06F 15/16

WO85/04967  11/1985  WIPO ............................. G06F 13/00

*Primary Examiner*—Wellington Chin
*Assistant Examiner*—Huy D. Vu
*Attorney, Agent, or Firm*—David R. Padnes; Nicholas J. Skarlatos

[57] ABSTRACT

Timing control resolution between two communications devices is provided by assigning each device to one of a plurality of priorities and by transmitting an identification of this priority to the other communications device. The determination of which device is the master and which device is the slave is then resolved by comparing the received and transmitted identifications from the contending devices to a predetermined ranking of identification signals. When such identifications signals are the same, each device randomly selects an identification signal from a group of such signals. Preferably this group includes all of the identification signals except that transmitted in the immediately prior contention round. The received and transmitted identifications signals from the contending devices are then compared to the predetermined ranking of identification signals. This random selection of identification signals, transmission and comparison are repeated until the transmitted and received identifications signals are different and contention is resolved or a predetermined number of contention rounds is reached.

21 Claims, 3 Drawing Sheets

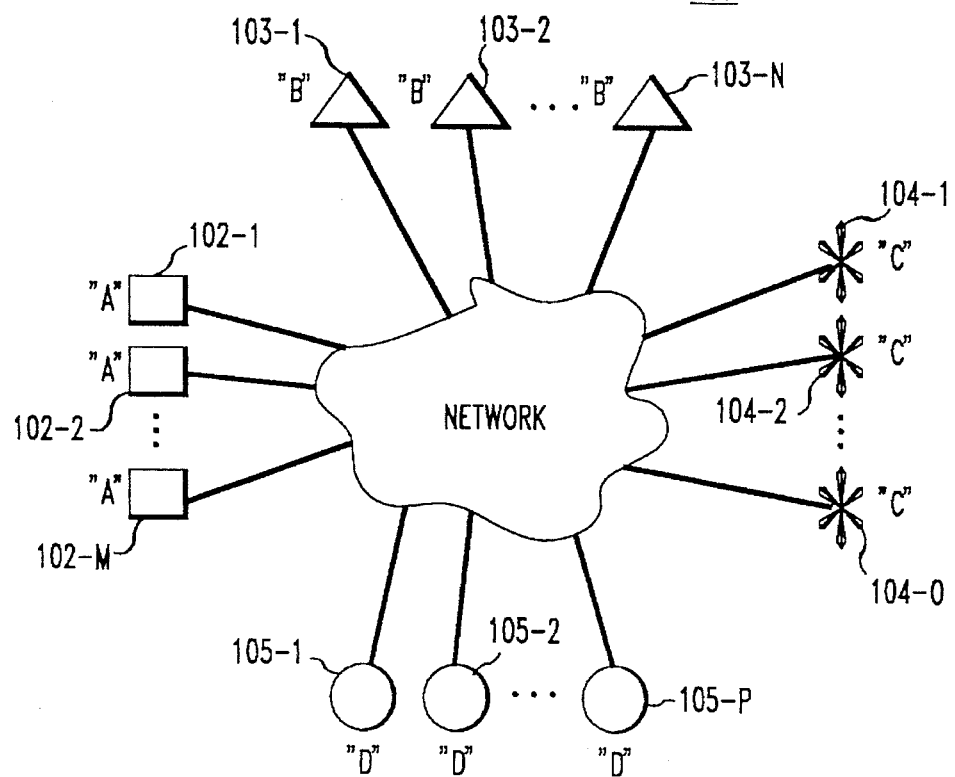

CONTENTION RESOLUTION SCHEME FOR COMMUNICATIONS SYSTEMS

This application is a continuation of application Ser. No. 07/938,197, filed on Aug. 28, 1992 abandoned.

TECHNICAL FIELD

The present invention relates to communications systems and, more particularly, to a scheme for resolving contention between two communications devices.

BACKGROUND OF THE INVENTION

Contention resolution schemes involve determining which of a plurality of entities gains control of a resource. In communications systems, a variety of resources, e.g., busses, scrambler algorithms, timing, etc., are vied for by more than one communications device. Scramblers are a type of communications devices which alter the data transmitted through a communications facility using a specific scrambling algorithm. The selection of different scrambling algorithms is often required for each communications direction in a bidirectional communications system. Specifically, in such systems, part of the transmitted signal appears as an "echo" in the incoming signal. When it is necessary to eliminate this echo in order to meet performance objectives, each device must include circuitry which is able to distinguish between this echo and the incoming scrambled signal. This, in turn, requires the use of different scrambling algorithms for each communications direction. One technique to fulfill this requirement is to designate the scrambling devices for one of the communications directions as master devices and to designate the scrambling devices for the other communications direction as slave devices. By assigning different scrambling algorithms to master and slave devices, the determination of the master and slave devices, in turn, assures the usage of different scrambling algorithms in each communications direction. Timing control resolution arises in communications systems when there is a need to determine which of a plurality of communications devices provides the master clock from which the other communications devices synchronize or "slave" their internal operations.

A variety of techniques have been used to resolve contention and, in particular, timing control resolution. In one such technique when there is a communications to be coupled between two devices, the master clock is the clock within the device which transmits first. While this technique works satisfactorily in many applications, there are applications where it is impossible for a communications device to determine whether it transmitted first because of the propagation delay between the time a signal is sent by one device and the time it is received by another device. As a result, two communications devices may reach inconsistent views as to which device transmitted first. It would, therefore, be desirable if a contention resolution could be devised which would eliminate these limitations.

SUMMARY OF THE INVENTION

In accordance with the present invention, contention resolution is provided by assigning one of a plurality of priorities to each communications device. These priorities have a predetermined ranking. Upon initiating transmission, each communications device transmits an identification signal corresponding to its assigned priority. In this initial round of contention, each contending communications device then compares its transmitted identification signal with the identification signal transmitted by the other contending communications device. When such signals are different, contention is resolved in accordance with the predetermined ranking. When these identification signals are the same, a new round of contention is begun and each contending communications device randomly selects and transmits a new identification signal and the comparison process is repeated. Advantageously, the new identification signal is randomly selected from a group of identification signals including all such signals except that transmitted in the last round of contention.

BRIEF DESCRIPTION OF THE DRAWING

FIG. 1 is a block-schematic diagram of an illustrative communications systems which incorporates the present invention;

FIG. 2 is a matrix which illustrates the contention resolution scheme provided by the present invention;

DETAILED DESCRIPTION

Figure 3:
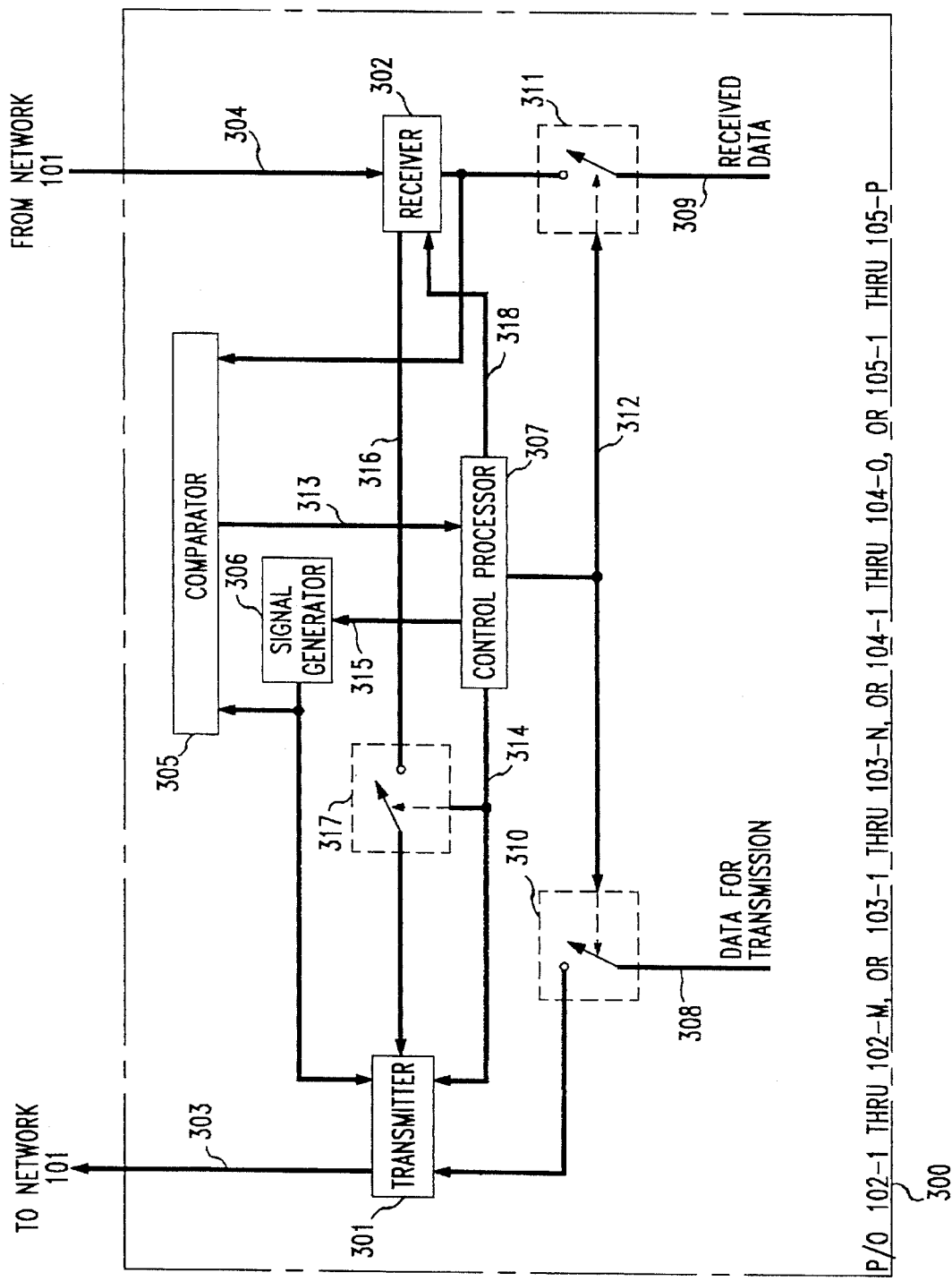
FIG. 3 is a block-schematic diagram of a portion of the communications devices used in the system of FIG. 1.

Communications system 100 in FIG. 1 provides communications services via network 101 for a plurality of communications devices. Each of these devices is assigned one of a plurality of priorities designated as "A", "B", "C" and "D". There are respectively M, N, O and P communications devices in each of these priorities, where each of M, N, O and P is any integer, and such devices are designated as 102-1 through 102-M, 103-1 through 103-N, 104-1 though 104-O, and 105-1 through 105-P. In accordance with the present invention, resolving contention between any two communications devices is provided by each communications device transmitting an identification upon initiating transmission. This transmitted identification signal and the identification signal received from another contending communications device are compared to a predetermined ranking of identification signals.

Refer now to FIG. 2 which shows in matrix form an illustrative ranking 200 utilized in the disclosed embodiment of the present invention. The four priorities A, B, C and D of FIG. 1 are shown in the left-hand vertical column and topmost horizontal row. Each box of the matrix shows the "winning" priority for resolving contention between two communications devices. For example, if communications devices having priorities A and C were contending for control of a communications resource, such as timing, box 201 shows that priority C would prevail. Accordingly, if timing were being contended for, the communications device with priority C would provide the master clock for communications to a device having priority "A" and this latter device would slave its operations off of the master clock signal recovered via a timing recovery circuit. Similarly, box 202 shows that for contention resolution between two communications devices having priorities B and D, the device having priority D would prevail. It should be noted that this matrix ranking arrangement resolves contention for all situations other than when the two contending devices have the same priority. This unresolved situation is illustrated by the question mark (?) for each of the diagonal boxes of the matrix. Pursuant to the present invention, when two communications devices having the same priority are contending, each device first transmits the identification signal corresponding to the device's assigned priority. When the examination of the transmitted and received identification signals reveals no difference between these signals, each device then randomly selects one of the other possible identification signals and transmits this signal. For example, if two communications devices having priority A were contending, each device would randomly select an identification signal from a group of identification signals B, C, or D. The selected identification signal is then transmitted by each device. While transmitting an identification signal, each communications device also detects any incoming identification signal. After an incoming identification signal is detected which is different from the previously received identification signal, the device continues to transmit its current identification signal for a predetermined time interval. The duration of this time interval is one which assures detection and decoding of the transmitted identification signal by the receiving communications device. Each communications device then compares the identification signal transmitted with the identification received and attempts to resolve contention in accordance with ranking 200. If this again led to an unresolved situation, e.g., each communications device selected the identification signal corresponding to priority B, then each communications device would randomly select an identification signal from the group including the identification signals corresponding to priorities A, C or D. The transmitted and received identification signals would then be compared and contention resolved in accordance with ranking 200. That is, in accordance with the present invention, when contention is unresolved by the transmission of an identification signal corresponding to the device's assigned priority, each device randomly selects one of the identification signals from a group including all of the identification signals except the last identification signal transmitted. This scheme assures that each communications device is always able to detect when a new identification signal has been selected and transmitted by the other device, i.e., when a new round of contention resolution has begun. Thus, both devices are synchronized, i.e., they have consistent views as to the status of the contention resolution. In addition, this scheme assures that the number of identification signals in the pool of such signals selected from does not decrease below X−1, where X is the number of different priorities. This minimum number of identification signals in the pool selected from assures that the probability of two devices selecting the same identification signal does not increase as new rounds of contention resolution are begun.

To implement the present invention, additional circuitry is included within each of the communications devices 102-1 through 102-M, 103-1 through 103-N, 104-1 through 104-O, and 105-1 through 105-P. One embodiment 300 of such circuitry is shown in FIG. 3. As depicted, this circuitry includes conventional transmitters and receivers respectively designated as 301 and 302. After contention resolution, transmitter 301 receives the data to be transmitted via lead 308 and couples this data in a predetermined way to lead 303 and thence network 101. Similarly, receiver section 302 receives data from network 101 via lead 304 and couples the received data after processing to lead 309. Now, pursuant to the present invention, circuitry 300 also includes comparator 305, signal generator 306, control processor 307 and switches 310, 311 and 317.

Prior to initiating transmission, switches 310, 311 and 317 are open. Control processor 307 directs signal generator 306 to output the identification signal corresponding to the assigned priority of the communications device to transmitter 301 which provides the same to network 101. Comparator 305 compares the identification signal transmitted with the identification signal received from the other contending communications device and provides the results of this comparison to control processor 307 via lead 313. Advantageously, to improve the comparison process, the comparator is supplied with the identification signal outputted by signal generator 306 and with the output of receiver 302. If this comparison reveals these identification signals are different, the control processor resolves contention using the ranking 200. If the comparison reveals these identification signals are not different, control processor 307 randomly selects one of the other identification signals and this signal is generated by the signal generator, coupled to the transmitter and provided therefrom to the network. Comparator 305 then repeats the above-described comparison and couples the results to the control processor. The sequence of randomly selecting an identification signal, transmitting this identification signal and comparing this signal to the received identification signal from the contended communications device is repeated until these identification signals are different and contention can be resolved in accordance with ranking 200.

It is preferable to include an upper limit on the maximum number of rounds of contention resolution. That is, if the number of contention rounds exceeds a predetermined upper limit, it is probable that a system error exists and the two contending communications devices will continue to select the same identification signal ad infinitum. In such case, it is desirable that the present contention resolution scheme be terminated as further rounds would be futile.

Once contention has been resolved, the control processor outputs a signal on lead 312 which closes switches 310 and 311 so as to allow data to be coupled to and from leads 309 and 308. In addition, when the present contention resolution scheme is used for resolving timing, the control processor outputs a signal on lead 314 which indicates whether the local communications device is a master or a slave device. This signal is coupled to transmitter 301 to control its internal operations. Specifically, for timing resolution, when the local communications device is the master, switch 317 remains in the open position and transmitter 301 and receiver 302 operate using a local clock source (not shown). Alternatively, when the local communications device is the slave, the signal on lead 314 causes the transmitter to operate using a clock signal recovered from the received data on lead 304. This recovered clock signal is provided in conventional fashion by receiver 302 and is coupled therefrom to lead 316. Or, for scrambling algorithm selection, the signal on lead 314 indicating that the local communications device is the master device causes the scrambler in the transmitter to utilize the algorithm previously designated for master devices. In addition, the signal on lead 318 (not required for timing resolution) causes the scrambler in the receiver to operate using the algorithm previously assigned to slave devices.

Figure 4:
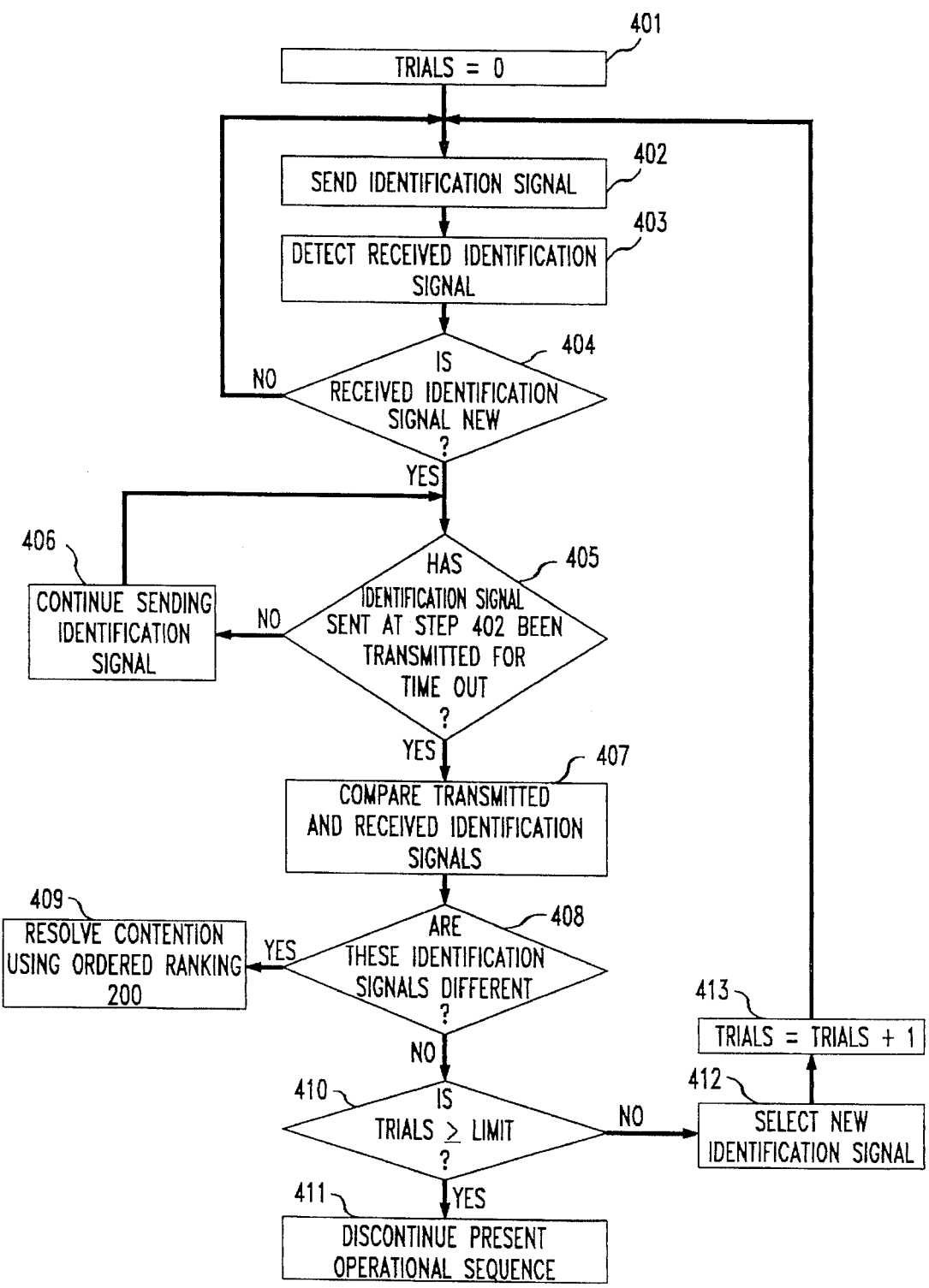
FIG. 4 is a flow chart of the sequence of operations provided by the circuitry of FIG. 3.

FIG. 4 summarizes the sequence of operations provided by circuitry 300 pursuant to the present invention. The operational sequence is initialized at step 401 by setting the variable "Trials" equal to 0. This variable represents the current number of contention resolution rounds. At step 402, the control processor causes an identification signal to be transmitted by the communications device in which the processor is disposed, i.e., the "local" communications device. This identification signal initially is that corresponding to the assigned priority of the local communications device.

At step 403, the identification signal received from a remote communications device is detected and, at step 404, the processor determines whether or not this received identification signal is different from that previously received. If these identification signals are not different, the sequence returns to step 402. If, however, these identification signals are different, at step 405, the processor determines whether the identification signal being transmitted by the local communications device has been transmitted for a predetermined time interval represented in FIG. 4 by the variable "Time Out". If this time interval has not elapsed, the processing proceeds to step 406 until this interval has elapsed. The time interval Time Out is selected to have a duration sufficient for a communications device to receive and decode an incoming identification signal. Once this interval has elapsed, at step 407, the identification signal transmitted by the local communications device and the identification signal received from the remote communications device are compared. If, at step 408, this comparison reveals that these identification signals are different, then contention is resolved at step 409 using the ranking 200. However, if at step 408 the identification signals are not different, then, at step 410, the variable Trials is compared to a predetermined upper limit represented in FIG. 4 by the variable "Limit". When Trials is equal to or greater than Limit, processing proceeds to step 411 wherein it is recognized that there is a significant defect in the contending communications devices and usage of the present contention resolution scheme is discontinued. At this point, it is preferable to commence usage of another one of the variety of prior art contention resolution schemes or activate a maintenance alarm. When Trials is less than Limit, then a new identification signal is selected at step 412. This selection process randomly picks an identification signal from a group of identification signals including all of the identification signals except the last transmitted identification signal. This exclusion of the last transmitted identification signal assures that a different identification signal will be transmitted by a communications device when contention has not been resolved and a new round of contention resolution is begun. At step 413, the variable Trials is incremented by one and processing then returns to step 402.

It should, of course, be noted that while the present invention has been described in terms of an illustrative embodiment, other arrangements will be apparent to those of ordinary skill in the art. For example, while the present invention has been described in reference to the discrete circuit elements shown in FIG. 3, the functionality of this circuit can be provided by one or more appropriately programmed general-purpose processors, or special-purpose integrated circuits, or digital signal processors, or an analog or hybrid counterpart of any of these devices. In addition, while in the disclosed embodiment there are four priorities and a plurality of communication devices assigned to each priority, the invention is not limited to this specific system. Indeed, the present invention is applicable to any system capable of operating with a plurality of priorities and wherein all such priorities are not presently utilized. Therefore, the invention could be used in a system where only one priority is currently utilized, the other priorities being assignable to communication devices which are not presently operating but could be activated, if desired. Finally, while the sequence of operations provided by the control processor has been represented by the flow chart of FIG. 4 which implies sequential operations, two or more of the depicted operations, such as operations 402–404, could be performed simultaneously.

We claim:

1. Apparatus for use in each of a pair of devices, each device having a first priority and providing a first identification signal representative of its first priority, said apparatus comprising:

means for comparing the first identification signal provided by each device in said pair;

means responsive to a first result of said comparison for randomly selecting in each device a second priority from a plurality of priorities provided in each device, each device in said pair providing a second identification signal representative of its second priority; and said comparing means also comparing the second identification signal provided by each device in said pair.

2. The apparatus of claim 1 further including means responsive to a second result of said comparison for resolving contention between said devices in accordance with a prescribed criterion.

3. The apparatus of claim 2 wherein said first result is that the compared first identification signals are the same and said second result is that the compared first identification signals are different.

4. The apparatus of claim 2 wherein said prescribed criterion is a ranking of first identification signals.

5. The apparatus of claim 1 wherein said selecting means, and comparing means associated with each device repeats their respective functions a predetermined number of times until said resolving means can resolve contention in accordance with said prescribed criterion.

6. The apparatus of claim 5 wherein said apparatus associated with each device discontinues operation if contention can't be resolved by said resolving means after said predetermined number of times.

7. The apparatus of claim 1 wherein said pair of devices comprises a first device and a second device, and wherein said selecting means associated with said first device forms a group of second identification signals so as to include identification signals representative of all priorities of said plurality of priorities except that priority represented by the identification signal most recently provided by said first device and said selecting means associated with said second device forms a similar group of identification signals so as to include identification signals representative of all priorities of said plurality of priorities except that priority represented by the identification signal most recently provided by said second device.

8. The apparatus of claim 1 wherein said devices comprise communications devices each having a clock and being coupled together for transmitting synchronized communications between said communications devices, one of said communications devices being assignable as a master device whereby the clock of an assigned master device forms a master clock for establishing synchronized communications between said communications devices and the other of said communications devices being assignable as a slave device whereby the clock of an assigned slave device forms a slave clock synchronized to the master clock for synchronizing the transmission of communications from said assigned slave device to said assigned master device, and wherein the priorities represented by the first and second identification signals determine which of said communications devices will be assigned as the master device and which of said communications devices will be assigned as the slave device in accordance with a ranking of the priorities and the first result of said comparison.

9. The apparatus of claim 1 wherein said pair of devices comprises a transmitting communications device and a receiving communications device coupled together for exchanging communications between said communications devices, with each of said communications devices having different first and second scrambling algorithms for scrambling incoming and outgoing communications, and wherein the priorities represented by the first and second identification signals determine which of said algorithms will be used by the transmitting communications device of said communications devices and which of said algorithms will be used by the receiving communications device of said communications devices in accordance with a ranking of the priorities and the first result of said comparison.

10. A method for use by each of a pair of devices, each device having one of a plurality of priorities and providing a first identification signal representative of its priority, said method comprising the steps of:

comparing the first identification signal transmitted by a first device in said pair to the first identification signal provided by a second device in said pair;

randomly selecting a second identification signal from a group of such identification signals when said comparison step provides a first result, said group of second identification signals being representative of more than one priority in said plurality of priorities; and comparing the selected second identification signals provided by said first and second devices.

11. In a communications system comprising first and second communications devices coupled together via a communications path for transmitting communications between the first and second devices, an apparatus is provided for each device for assigning a respective priority to each device, the apparatus of each associated device having a plurality of priorities and being operable to provide a first identification signal on behalf of its respective device representative of a first selected priority, the apparatus of each associated device comprising:

means for comparing the first identification signal provided on behalf of the first device with the first identification signal provided on behalf of the second device;

means for selecting a second priority of the plurality of priorities when the first identification signals provided on behalf of the first and second devices are the same;

means for providing a second identification signal representative of the second selected priority; and the comparing means further comparing the second identification signals provided on behalf of the first and second devices.

12. The apparatus of claim 11, wherein the apparatus further comprises means responsive to a second result of the comparison for resolving contention between the first and second devices in accordance with a ranking of the first identification signals.

13. The apparatus of claim 12, wherein the first result is that the compared first identification signals are the same and the second result is that the compared first identification signals are different.

14. The apparatus of claim 12, wherein the selecting means and the comparing means associated with each device repeat their respective functions a predetermined number of times in resolving any contention, and wherein the apparatus associated with each device discontinues operation if contention cannot be resolved by the contention resolving means after the predetermined number of times.

15. The apparatus of claim 11, wherein one of said communications devices comprising a master device having a master clock for establishing synchronized communications between the first and second devices and the other of said devices comprising a slave clock synchronized to the master clock for synchronizing the transmission of its communications to said one of said devices, and wherein the priorities represented by the first and second identification signals determine which of said devices will be the master device and which of said devices will be the slave device in accordance with a ranking of the priorities, the first result of said comparison and the second result of said comparison.

16. The apparatus of claim 11, wherein each of said communications devices having different first and second scrambling algorithms for scrambling incoming and outgoing communications, and wherein the priorities represented by the first and second identification signals determine which of said algorithms will be used by the transmitting device of said devices and which of said algorithms will be used by the receiving device of said devices in accordance with a ranking of the priorities, the first result of said comparison and the second result of said comparison.

17. In a communications system comprising first and second communications devices coupled together via a communications path for transmitting data communications between the first and second devices, an apparatus is provided for each device for assigning a respective priority to each device, the apparatus of each associated device being operable to provide a plurality of the same prioritized identification signals on behalf of its respective device, with selected ones of the prioritized identification signals provided on behalf of each device being transmitted to the other device via the communications path, the apparatus of each associated device comprising:

means for ranking the plurality of prioritized identification signals;

means for continually detecting the selected ones of said prioritized identification signals transmitted over the communications path;

means for comparing the detected identification signals respectively provided on behalf of the first and second devices and transmitted over the communications path;

means for assigning a respective priority to each device in accordance with the ranking of the plurality of identification signals when the most recently compared identification signals are different; and means for transmitting to the other device via the communications path another identification signal selected from the plurality of identification signals excluding the most recently compared identification signal when the most recently compared identification signals are the same.

18. The apparatus of claim 17, wherein the comparing means and the transmitting means of the apparatus repeat their respective functions a predetermined number of times until the assigning means assigns a respective priority to each device.

19. The apparatus of claim 18, wherein the apparatus of each associated device discontinues operation if the assigning means does not assign a respective priority to each device after the comparing means and transmitting means repeat their respective functions for the predetermined number of times.

20. The apparatus of claim 17, wherein one of said communications devices comprises a master device having a master clock for establishing synchronized communications between the first and second devices and the other of said devices comprising a slave clock synchronized to the master clock for synchronizing the transmission of its communications to said one of said devices, and wherein the respective priority assigned to each device by the assigning means determines which of said devices will be the master device and which of said devices will be the slave device.

21. The apparatus of claim 17, wherein each of said communications devices comprise different first and second scrambling algorithms for scrambling incoming and outgoing communications, and wherein the respective priority assigned to each device by the assigning means determines which of said algorithms will be used by the transmitting device of said devices and which of said algorithms will be used by the receiving device of said devices.

* * * * *